Dec. 7, 1965    P. C. GARDINER    3,221,693
TARGET ANGLE DISCRIMINATOR FOR DIRECTIONALLY
SENSITIVE WAVE ENERGY RECEIVERS
Filed Oct. 4, 1950    2 Sheets-Sheet 1

INVENTOR
PAUL C. GARDINER
BY
ATTORNEY

Dec. 7, 1965 P. C. GARDINER 3,221,693
TARGET ANGLE DISCRIMINATOR FOR DIRECTIONALLY
SENSITIVE WAVE ENERGY RECEIVERS
Filed Oct. 4, 1950 2 Sheets-Sheet 2

INVENTOR
PAUL C. GARDINER
BY
ATTORNEY

United States Patent Office 3,221,693
Patented Dec. 7, 1965

3,221,693
TARGET ANGLE DISCRIMINATOR FOR DIRECTIONALLY SENSITIVE WAVE ENERGY RECEIVERS
Paul C. Gardiner, Scotia, N.Y., assignor, by mesne assignments, to the United States of America as represented by the Secretary of the Navy
Filed Oct. 4, 1950, Ser. No. 188,464
6 Claims. (Cl. 114—23)

The invention relates to improvements in electric signalling systems and more particularly to a target angle discriminator for the electroacoustic receiver of an echo controlled torpedo.

The echo ranging torpedo is similar in appearance to an ordinary torpedo but has a transducer in the nose and associated transmitter, receiver and rudder control circuits in the body. The transducer projects short pulses or pings of high frequency energy into the water at definite intervals of time. As any of these pulses strike a target in the water ahead of the torpedo an echo is reflected back and picked up by the transducer. This echo signal is then processed by the receiver and control circuits and the rudders set to direct the torpedo toward the target.

Water conditions have to be taken into account in order to make an echo ranging torpedo practical. After the pulses of high frequency power are projected false echoes may be reflected back from the surface or bottom of the ocean depending on the dimensions of the projected beam. The best transducer design for underwater torpedo control still results in objectionably wide echo ranging lobes conducive to surface and bottom response.

An important object of this invention is the provision in an echo controlled steering system of a target angle discriminator adapted to avoid bottom and surface response.

Another object is to provide means adapted to reduce the effective width of the lobe-shaped sensitivity pattern of an electroacoustic transducer.

A further object is the provision in a system of the character described of circuits adapted to artificially cause the echo receiver to disregard echoes returning from undesirable angles whether these signals are from the ocean bottom or from an actual target.

Other objects and advantages of the invention will become apparent during the course of the following detailed description, taken in connection with the accompanying drawings forming a part of this specification and in which drawings, FIG. 1 is a diagrammatic view of the target angle discriminator applied to an echo controlled steering system.

Figure 1:
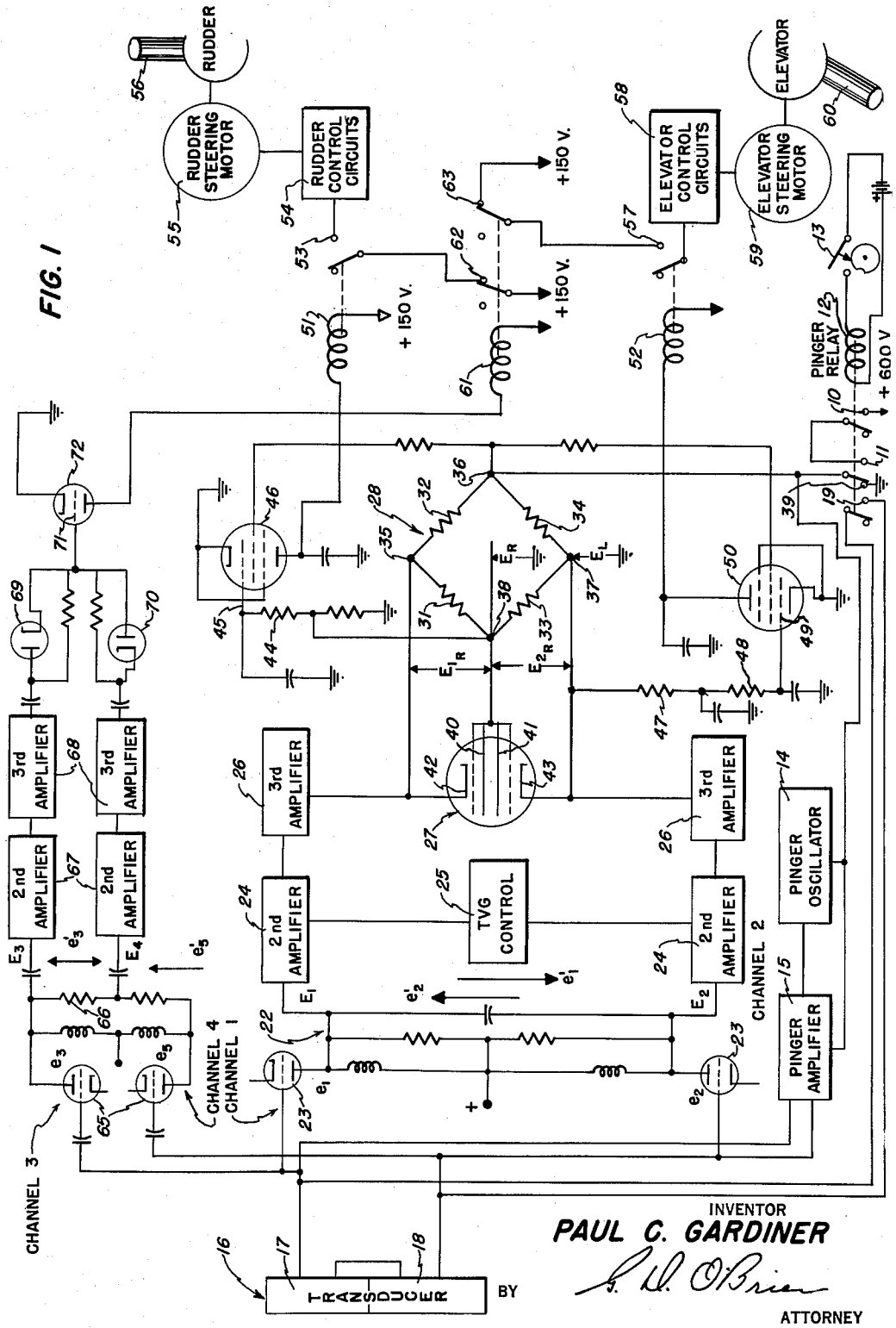

Under the control of series contacts 10, 11 of a pinger relay 12 energized upon closing of the cam-operated switch 13 shown in FIG. 1, pulses or pings of 60-kc. voltage and 30-milliseconds duration are generated and amplified by a pinger oscillator 14 and amplifier 15. These pulses or pings are propagated every 0.8 second through a transducer 16 whose vertically spaced sections 17, 18 are connected in parallel during transmission by a contact 19 of the pinger relay 12. The supersonic waves leave the transducer and, if there is a target present within range, are reflected back as echoes. Upon reaching the transducer, these echoes are translated into electrical input signals in dual amplifier channels 1, 2, the two parts of the transducer acting independently during reception.

The transducer is positioned in the nose of the torpedo with its physical axis vertical. Electrically it is so connected that the upper and lower sections are in phase during transmission giving a single lobe pattern, narrow in the vertical or depth direction and broad in azimuth. During the intervals between transmission the upper and lower sections of the transducer are in effect connected to two similar channels of the detection circuitry. This dual channel connection gives a two, or simultaneous lobe listening pattern of the type shown in FIG. 2 and allows the depth of the target to control the dive angle of the torpedo through detection of the time difference in the echo striking both sections of the transducer.

If an echo returns from a target below the axis of the torpedo, the wave front will strike the lower half of the transducer first and the signal voltage generated in the lower half will lead in phase that generated in the upper half. Likewise, if the echoes are from a target above the axis of the torpedo, the signal voltage in the upper half will lead that in the lower half. Each degree of physical target angle produces 13 electrical degrees of difference between the two halves of the transducer. Consonant with the general principles explained in Patent 2,433,991 granted to Hebb, this phase difference is converted into an amplitude difference by a 90° lead line 22 following the first stage 23 of dual amplification. In the upper portion of FIG. 3 the outputs $E_1$ and $E_2$ of channels 1, 2 for various target angles are graphically shown. Output $E_1$ is the resultant of the first stage amplifier output voltage $e_1$ combined with a voltage $e_2^1$ that is transferred to channel 1 through the lead line 22. Output $E_2$ is the resultant of the first stage amplifier output voltage $e_2$ combined with a voltage $e_1^1$ that is transferred to channel 2 through the lead line 22. It is true that an exact advance of 90° is not obtained. The circuit does, however, advance the phase approximately 90°, for example, of $e_1$, as it passes through the capacitor of lead line 22 becoming $e_1^1$ inasmuch as the inductors are large and have little influence and the resistors are somewhat low compared with the capacitive reactance of the capacitor at the frequency, about 60 kc., involved. This results in $e_1^1$ leading $e_1$ by approximately 90° at somewhat lower amplitude. Even though $e_2^1$ and $e_1^1$ are reduced, the circuit nevertheless accomplishes a difference in amplitude between $E_1$ and $E_2$, due mainly to the phase difference. The lag-line description in my copending application Serial No. 166,286 filed June 5, 1950, involves lagging instead of leading but the same general principles of vector addition apply. At the second amplifier stage 24, the overall sensitivity of the receiver is gradually increased during each reception interval by a time-variation-of-gain (TVG) control 25. This TVG control prevents false tripping of the steering control circuits on reverberation immediately following the ping and also prevents amplifier overloading on strong echo signals at close range.

The processed signals from both channels 1, 2, after a third amplifier stage 26, are rectified by a twin diode 27 and applied to a comparator bridge 28 which acts as interpreter and disseminator of information necessary for correct rudder and elevator operation. This comparator bridge comprises four resistor arms 31–34 joined at corners 35–38. During reception the right corner 36 is grounded through a pinger relay contact 39. The plates 40, 41 of the twin diode 27 are each connected to the left corner 38 of the bridge, and the cathodes 42, 43 are connected one to the upper corner 35 and the other to the lower corner 37. Potential from the left corner 38 is impressed through a resistor 44 on the control grid 45 on an echo trip pentode 46. Potential from the lower corner 37 is impressed through resistors 47, 48 on the control grid 49 of an elevator trip pentode 50.

Normally, when no echoes are present, both the echo tube 46 and the elevator tube 50 conduct plate current energizing echo and elevator relays 51, 52, respectively. The echo relay 51 through its contact 53 initiates operation of various rudder control circuits 54 which control a reversible rudder steering motor 55 adapted to displace the torpedo rudder 56 to the right or left. Likewise, the elevator relay 52 through its contact 57 initiates operation of various elevator control circuits 58 which control a reversible elevator steering motor 59 adapted to elevate or depress the torpedo elevator 60.

When the rectified channel voltages $E_{1R}$ and $E_{2R}$ are equal, the voltage $E_R$ derived from the left bridge corner 38 for echo tube control is negative and equal to either channel voltage $E_{1R}$ or $E_{2R}$; and the voltage $E_L$ derived from the lower bridge corner 37 for elevator tube control is equal to one half the difference between voltages $E_{1R}$ and $E_{2R}$, which is zero.

When the rectified channel voltages $E_{1R}$ and $E_{2R}$ are unequal, the voltage $E_R$ at the left bridge corner 38 is equal to minus one half the sum of the voltages $E_{1R}$ and $E_{2R}$ which is always negative; and the voltage $E_L$ derived from the lower bridge corner 37 is equal to one half the difference between voltages $E_{2R}$ and $E_{1R}$. Voltage $E_L$ is therefore positive if voltage $E_{2R}$ is greater than voltage $E_{1R}$ and negative if voltage $E_{1R}$ is greater than voltage $E_{2R}$.

Three stages are involved in the operation of the torpedo, namely, initial dive, search and pursuit. The purpose of the initial dive is to get the torpedo down to its operating depth as rapidly as possible. The search stage enables the torpedo to make a 360 degree sweep of the surrounding region to locate the target. The pursuit stage is that wherein the device is homing on the target. For azimuth steering "off-on" control of the vertical rudders is used. As soon as the torpedo starts its dive, it goes into a port circle having a radius of about 140 feet, under the control of a gyroscope (not shown) associated with the rudder control circuit 54, until target echoes are picked up. When the first echo of sufficient duration and magnitude is received during search, while torpedo is normally turning in a port circle, the left corner 38 of the bridge becomes negative regardless of the direction from which the echoes arrive, as previously explained. The normally conducting echo tube 46 is biased to cut off by the negative voltage from the bridge corner 38, thereby deenergizing the echo tube plate circuit relay 51. Assuming that the relay 61 of the hereinafter described discriminator is deenergized and its contacts 62, 63 closed, the rudder control circuits 54 thereupon are adapted to so energize the rudder steering motor 55 that the course of the torpedo will be changed from port to starboard. This will eventually result in the loss of the signal since the torpedo will turn away from the target. Upon the loss of echo signals, and after a prescribed time, the horizontal steering control circuits 54 are adapted to reverse the rudder steering motor 55. Thereupon the torpedo will resume its port circular turn until echoes are again received, when it will change its course once more to starboard. This operation, continuing until actual contact is made with the target, is called off-on steering.

Depth steering for all stages of operation of the torpedo is eventually controlled by a pendulum (not shown) associated with the elevator control circuits 58. While searching for a target, the torpedo is directed along a downward helical path at a substantially constant slightly negative pitch angle controlled by the pendulum and elevator control circuits 58. As for depth steering during pursuit, the comparator bridge resolves the amplitude difference between the rectified outputs of the two channels 1 and 2 into either positive or negative signal voltage depending on whether the echo source is above or below the transducer. This signal voltage is impressed on the control grid 49 of the elevator tube 50 which, in conjunction with the elevator control circuits 58, controls depth steering.

The comparator bridge is made inoperative during ping transmission by the application of 600 volts thereto through the pinger relay contact 60.

Connected in parallel with the previously described dual channels 1, 2 are additional dual amplifier channels 3, 4 including a first stage 65 of amplification followed by a 90° lead line 66.

The processed signals from both channels 3, 4 after second and third amplifier stages 67, 68 are rectified to produce negative and positive outputs by dual rectifier tubes 69, 70, respectively, and the resultant output is impressed on the grid 71 of a tube 72 having the previously-mentioned relay 61 in its plate circuit.

Figure 3:
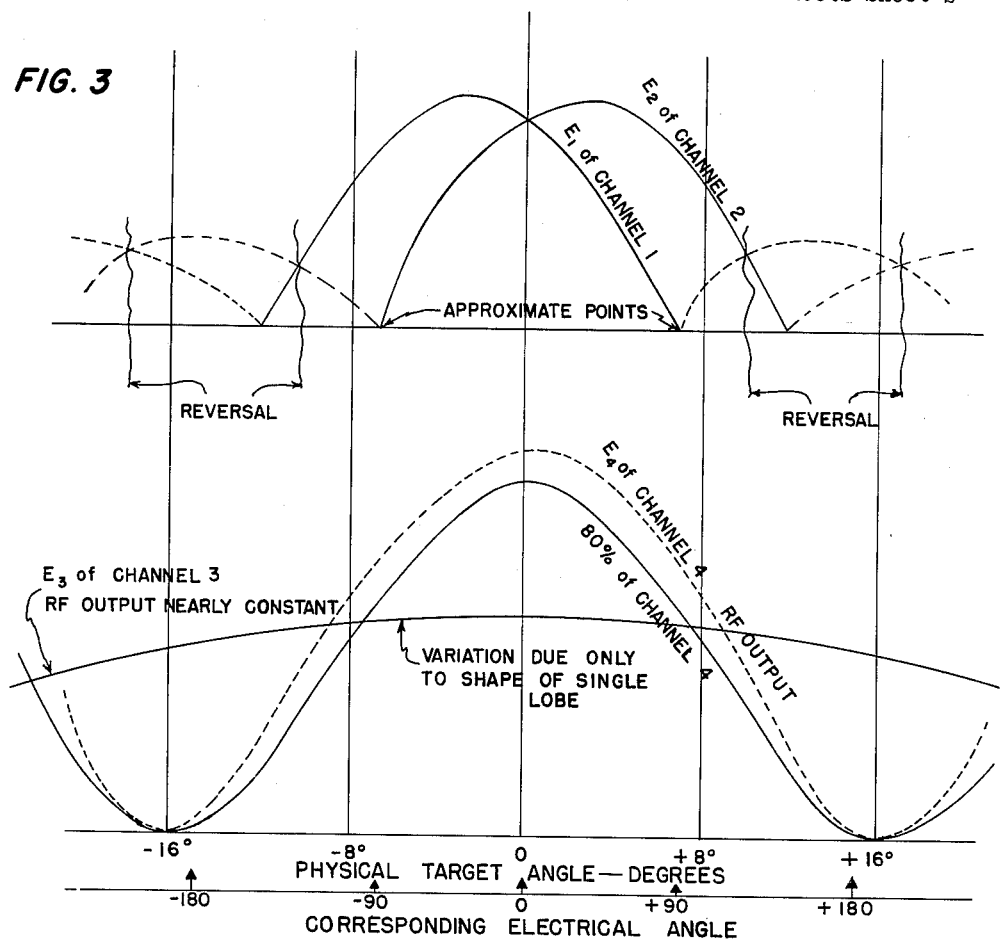
FIG. 3 is a diagrammatic view showing the relationship of degrees of physical target angle to electrical degrees of phase difference between the two halves of the transducer and the relative magnitudes of the multichannel output voltages.

In the lower portion of FIG. 3 the outputs $E_3$ and $E_4$ of channels 3, 4 for various target angles are graphically shown. Output $E_3$ equals output voltage $e_3$ of the first amplifier stage of channel 3. Output $E_4$ is the resultant of voltages $e_3{}^1$ and $e_5{}^1$ transferred from channels 3, 4 through the lead line 66. From an inspection of the curves in the lower portion of FIG. 3, it will be observed that when the physical target angle is between plus 7 and minus 7 degrees, 80 percent of the output of channel 4 is greater than the total output of channel 3. Within this range, therefore, the negative D.C. output of rectifier 69 exceeds the positive D.C. output of rectifier 70 and the resultant negative bias on the grid 71 prevents conduction of plate current by the tube 72. Thus, while the target angle is between plus 7 and minus 7 degrees, the discriminator relay 61 remains open and its contacts 62, 63 remain closed permitting channels 1 and 2 to exert normal control on the torpedo steering gear.

Beyond plus 7 and minus 7 degrees, there are bad minor lobes and reversals from channels 1 and 2. It is therefore desirable that channels 1 and 2 be not allowed to control when echoes are returned to the transducer at angles greater than 7 degrees. In these undesirable regions, 80 percent of the output of channel 4 is less than the total output of channel 3 and hence the positive output of rectifier 70 exceeds the negative output of rectifier 69. Therefore, tube 72 conducts during reception of these signals; the discriminator relay 61 is energized by plate current so that switches 62, 63 are open; and channels 1 and 2 are not allowed to control.

Figure 2:
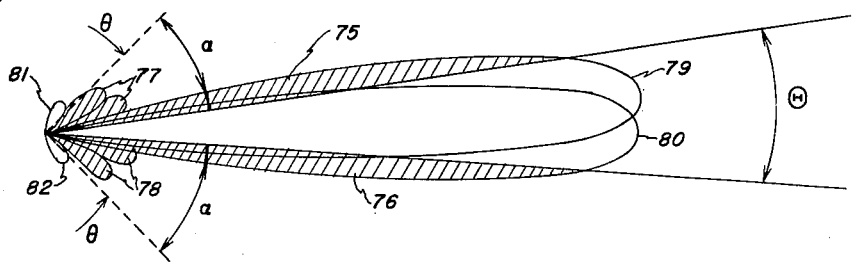
FIG. 2 is a diagrammatic view of a typical simultaneous lobe listening sensitivity pattern of an electroacoustic transducer and shaded to show areas effectively eliminated by the target angle discriminator.

From the foregoing description it is clear that the shaded areas 75–78 may be effectively eliminated from the echo ranging lobes 79, 80 shown in FIG. 2 by blanking receiver output as described in the previous paragraph. Controls are allowed from signals coming only from within the limits of angle $\theta$, which in the present example is about 14 degrees. This is of great importance in that much surface and bottom response comes from within the limits of the angles $\alpha$ so that reverberation is effectively reduced by disregarding these regions designated $\alpha$. Moreover, signals coming from a substantial part of the regions $\alpha$ cause control in the wrong direction, called reversals. These false controls are eliminated since all signals from the regions $\alpha$ are rejected.

At approximately a 20 degree target angle, the curve in FIG. 3 representing 80 percent of the output of channel 4 recrosses and extends above the curve representing the total output of channel 3. Therefore, at target angles $\theta$, $\theta$ exceeding 20 degrees, control prevention is lost but at these extreme angles the minor lobes 81, 82 are so small that normal and greater than normal targets will not exert control.

Various changes may be made in the form of invention herein shown and described without departing from the spirit of the invention or the scope of the following claims.

What is claimed is:

1. In a signaling system of the character described, a receiver adapted to directionally receive wave energy in accordance with a sensitivity pattern and to generate electric oscillations varying with changes in the direction of reception of said wave energy, a discriminator energized by said receiver generated oscillations adapted to furnish a signal upon the reception by the receiver of wave energy beyond predetermined angular limits, and means actuated by said discriminator signal adapted to blank said receiver output whereby the effective width of said sensitivity pattern is held within said predetermined angular limits.

2. In a signaling system of the character described, a receiver adapted to directionally receive wave energy in accordance with a sensitivity pattern and to generate electric oscillations having a phase difference varying with changes in the direction of reception of said wave energy, a phase sensitive discriminator energized by said receiver generated oscillations adapted to furnish a signal upon the reception by the receiver of wave energy beyond predetermined angular limits, and means actuated by said discriminator signal adapted to blank said receiver output whereby the effective width of said sensitivity pattern is held within said predetermined angular limits.

3. In a signaling system of the character described, a receiver including transducers adapted to directionally receive wave energy in accordance with lobe-shaped sensitivity patterns and to generate electric oscillations having a phase difference varying with changes in the direction of reception of said wave energy, a phase sensitive discriminator energized by said transducer output and adapted to furnish a signal upon the reception by the receiver of wave energy beyond predetermined angular limits, and means actuated by said discriminator signal adapted to blank said receiver output whereby the effective width of said lobe-shaped sensitivity patterns is held within said predetermined angular limits.

4. In an automatic electric steering system for directing a moving body equipped with steering gear toward a source of high-frequency wave energy, means including a two-part transducer adapted to directionally receive said wave energy in accordance with overlapping lobe-shaped sensitivity patterns and to generate separate electric oscillations having a phase difference varying with the direction of reception of said wave energy, means responsive to variations in said phase difference for controlling said steering gear, a phase-sensitive discriminator energized by said separate electric oscillations and adapted to furnish a signal upon the reception by the receiver of wave energy beyond predetermined angular limits, and means actuated by said discriminator signal adapted to blank said receiver output and thus disable said steering gear control means upon the reception of signals from an excessive target angle.

5. In an automatic electric steering system for steering an underwater torpedo toward a target, a transmitter for projecting acoustic waves underwater, control means adapted to effect operation of said transmitter during spaced transmission periods separated by listening intervals, a receiver adapted to translate echoes of said projected acoustic waves, upon reception, into electrical steering control signals, steering gear normally responsive to said control signals, a discriminator adapted to furnish a signal upon the reception by the receiver of echoes beyond predetermined angular limits, and means actuated by said discriminator signal adapted to prevent response of said steering gear to said steering control signals.

6. In a signaling system of the character described, a receiver including a two-part transducer adapted to directionally receive wave energy in accordance with overlapping lobe-shaped sensitivity patterns and to generate dual electric oscillatory outputs having a phase difference varying with changes in the direction of reception of said wave energy, means including a phase shifting line interconnecting said transducer outputs for providing a signal of a magnitude commensurate with the direction of reception of said wave energy responsive to said signal, a phase sensitive discriminator energized by said dual transducer outputs and including a phase shifting line adapted to furnish a signal upon the reception by said transducer of wave energy beyond predetermined angular limits, and means actuated by said discriminator signal adapted to prevent response of said receiver whereby the effective width of said lobe-shaped sensitivity patterns is held within said predetermined angular limits.

References Cited by the Examiner
UNITED STATES PATENTS

| | | | |
|---|---|---|---|
| 2,349,370 | 5/1944 | Orner | 114—23 X |
| 2,409,632 | 10/1946 | King | 114—23 |
| 2,420,676 | 5/1947 | Peterson | 114—23 |
| 2,442,605 | 6/1948 | Koch | 343—11 X |

BENJAMIN A. BORCHELT, *Primary Examiner.*

JAMES L. BREWRINK, NORMAN H. EVANS, CHESTER L. JUSTUS, *Examiners.*